Jan. 2, 1940.                    W. E. BARNHART                    2,185,881
                       APPARATUS FOR FORMING A HEDGE SHEAR BLADE
                          Filed Oct. 14, 1937            2 Sheets-Sheet 1
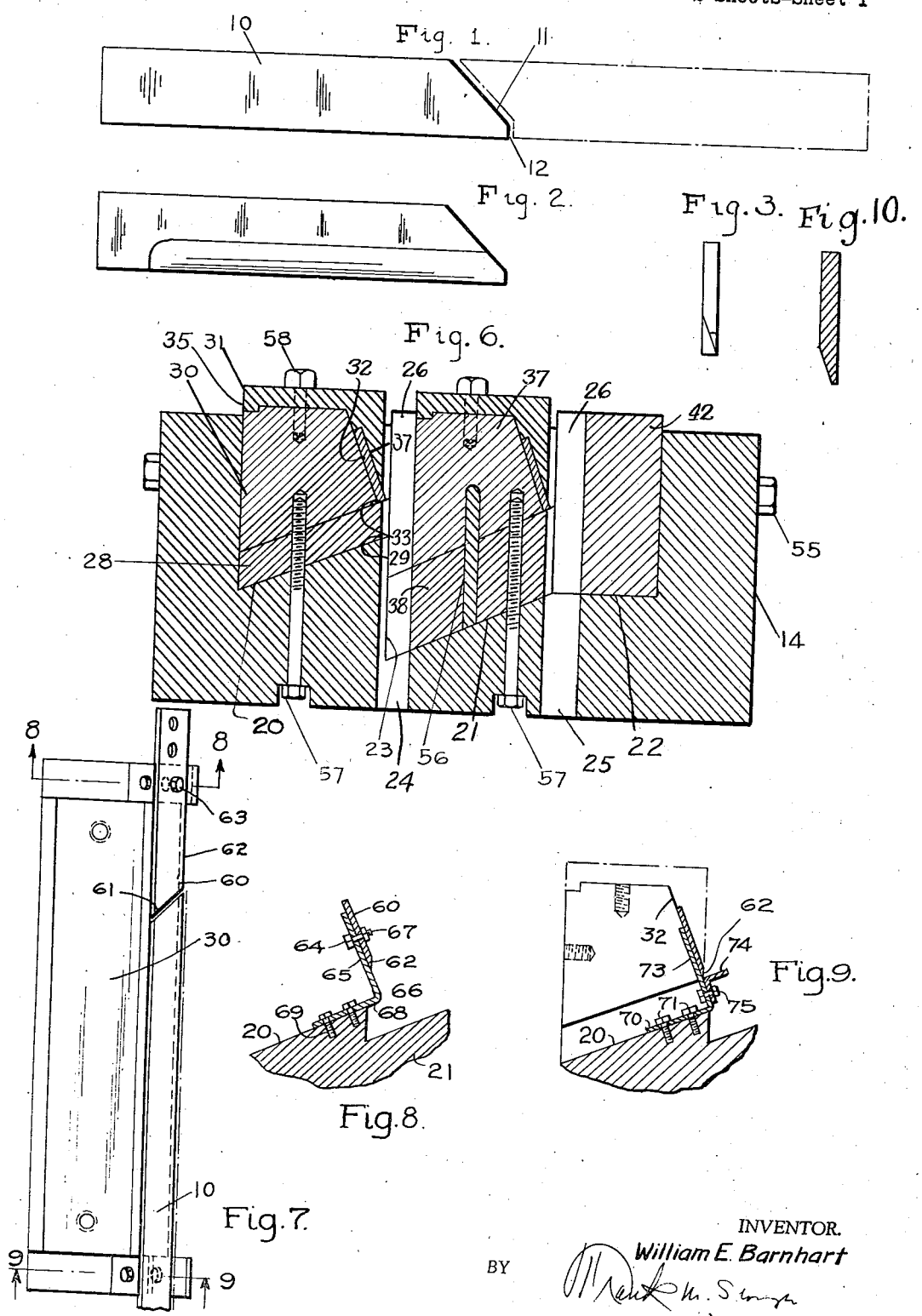
INVENTOR.
William E. Barnhart
BY
His ATTORNEY.

Jan. 2, 1940.  W. E. BARNHART  2,185,881
APPARATUS FOR FORMING A HEDGE SHEAR BLADE
Filed Oct. 14, 1937  2 Sheets-Sheet 2

INVENTOR.
William E. Barnhart
BY
His ATTORNEY.

Patented Jan. 2, 1940

2,185,881

UNITED STATES PATENT OFFICE 2,185,881

APPARATUS FOR FORMING A HEDGE SHEAR BLADE

William E. Barnhart, Perth Amboy, N. J., assignor, by mesne assignments, to The American Fork & Hoe Company, Cleveland, Ohio, a corporation of Ohio Application October 14, 1937, Serial No. 168,897

4 Claims. (Cl. 164—34)

This application relates to hedge shear blades and the like, more particularly to an improved method and apparatus for forming the bevel edge of the blade.

Hedge shear blades and similar type blades are usually formed of rolled stock, generally rectangular in cross-section and one longitudinal edge portion is beveled. Prior hedge shear blades and the like with which I am familiar have had the beveled edge formed either by forging or milling operation, both of these methods being relatively expensive due to the apparatus required and the time involved.

I have devised an apparatus whereby the beveled edge of a shear blade of this type may be formed relatively quickly and economically by punching operations involving rough-shearing the beveled edge of the blade and subsequently finish shearing the beveled edge.

The primary object of my invention, therefore, is to provide an improved method and apparatus for forming the beveled edge of hedge shear blades and the like.

Another object of my invention is to provide apparatus for forming hedge shear blades and the like quickly and economically.

Another object of my invention is to provide apparatus for forming hedge shear blade or the like by punching operations.

Another object of my invention is to provide an improved die or fixture for holding a hedge shear blade or the like while forming a beveled edge thereon.

Another object of my invention is to provide a relatively rugged die or fixture used in forming shear blades comprising parts which may be quickly and easily disassembled for replacement or repair.

Other objects of my invention and the invention itself will become increasingly apparent from a consideration of the following description and drawings wherein:

Fig. 1 is a plan view of a shear blade blank which I may employ prior to having the cutting edge formed thereon;

Figs. 2 and 3 are plan and elevational views respectively of the blank of Fig. 1 provided with a cutting edge;

Fig. 6 is a sectional view taken along the line 6—6 of Fig. 4;

Fig. 7 is a plan view of a cutter blank and stop element which I may employ;

Fig. 8 is a fragmentary section taken along the line 8—8 of Fig. 7;

Fig. 9 is a fragmentary sectional view taken along the line 9—9 of Fig. 7, and

Fig. 10 is an end view of the shear blade blank at the finish of the first shearing operation.

Figure 4:
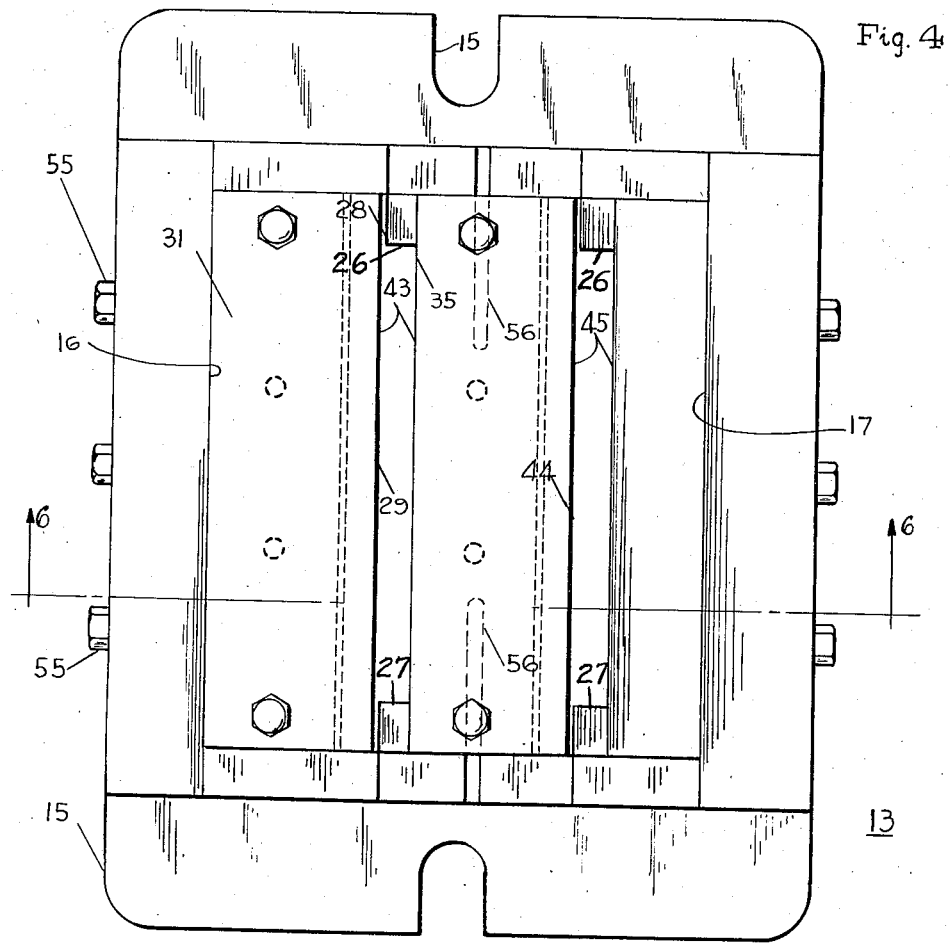
Fig. 4 is a plan view of a die apparatus which I may employ for providing a cutting edge on the blank.

Referring now to the drawings, and particularly to Figs. 1 and 2, I have shown generally at 10 a shear blade preferably formed of rolled stock, rectangular in cross-section, having one end angularly cut as indicated at 11. The stock from which the blanks are formed may be secured in relatively long lengths and severed as indicated, with one end square and the other end angularly disposed so that a negligible amount of material is wasted. Preferably the shear blade blank at the angularly disposed end has a relatively short portion extending at right angles to the longitudinal end of the blank as indicated at 12. This provides a more desirable construction from the standpoint of a finished blade when operating the shears and for subsequent re-sharpening as compared to a V-point.

The blank 10 is then inserted in a die or similar work holding apparatus, generally indicated at 13, comprising a die shoe 14, having a plane base including slotted end portions, indicated at 15, whereby the die shoe may be securely fixed to a support by projecting bolts through the slots 15 or in any suitable manner. The die shoe 14 is recessed to provide longitudinally extending side walls 16 and 17 and an intermediate recessed portion of step-form base comprising a sloped portion 20, a sloped central portion 21, and a horizontal portion 22. A longitudinally extending shoulder 23 is thus formed intermediate the sloping portions 20 and 21. Two longitudinally extending and generally rectangular perforations indicated at 24 and 25 extend from the sloping portions 20 and 21 respectively through the base of the die shoe, the perforations terminating longitudinally as indicated at 26 and 27.

A cutter blade 28 is supported on the sloped portion 20 and is longitudinally co-extensive therewith, the end portions of the cutter blade being substantially of the same width as the sloping portion 20 and the intermediate blade portion being slightly cut back in a vertical plane and along a longitudinal edge as indicated at 29 for a purpose to be later described. A work rest generally indicated at 30 is superposed on the cutter blade 28 and is maintained thereon by a hold-down clamp 31, the work rest, cutter blade, and hold-down clamp preferably being co-extensive longitudinally.

Figure 5:
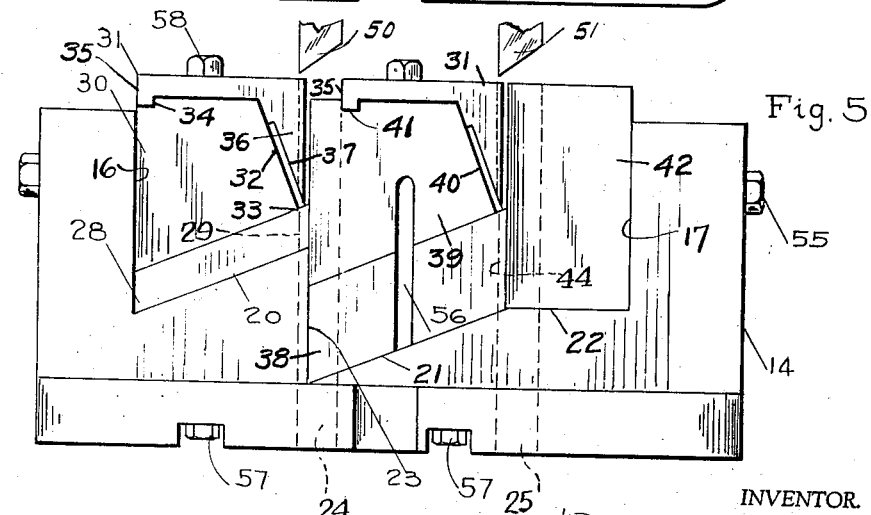
Fig. 5 is an end elevational view of the apparatus of Fig. 4.

The work rest 30 has an upwardly sloping face 32 terminating downwardly along a line slightly spaced from and extending parallel to the cutback portion 29 of the cutter blade 28, as indicated at 33 of Figs. 5 and 6. The work rest 30 is step-shouldered as indicated at 34, whereby it may be engaged by a depending longitudinally extending flange 35 of the hold-down clamp which is also provided with a generally V-shaped depending portion 36, undercut as is indicated at 37 to provide a surface spaced from and parallel to the inclined face 32 of the work rest.

A second relatively thick cutter blade 38 is supported on the central slope portion 21 and against the vertically extending shoulder 23 of the die shoe 14. Superposed on cutter blade 38 is a second work rest 39, having a longitudinally extending inclined face 40 preferably inclined at substantially the same angle as face 32 of work rest 30, the work rest 39 also being provided with a longitudinally extending groove 41 in the top face thereof within which is seated flange 35 of a second-hold down clamp 31. Supported on the horizontal portion 22 of the die shoe and abutting cutter blade 38 is a punch-backing element 42 generally rectangular in cross-section.

The work rest 39 and cutter blade 38 have one longitudinal edge portion recessed as indicated at 43, to cooperate with the cut back portion 29 of cutter blade 28 to form a generally rectangular opening therebetween corresponding to the perforation 24 through the base of the die shoe 14. The opposite longitudinal edge of cutter blade 38 is a cut back as indicated at 44 to cooperate with a recessed portion of punch-backing element 42 as indicated at 45 to form a second generally rectangular opening therebetween corresponding to the second perforation 25 of the die shoe 14. The shear blade blank 10 may be projected between the work rest 30 and hold down clamp 31, whereby it will be supported intermediate the inclined face 32 of work rest 30 and face 37 of the hold-down clamp 31 to overhang the cut-back portion or edge 29 of the cutter blade 28. The overhanging portion of the blank 10 or the portion extending into the rectangular opening is of generally V-form and after the shear blade blank 10 has been projected axially within the die shoe 14 a predetermined amount, it may be operated on by a generally rectangular punch 50 which is vertically reciprocable to rough shear the overhanging V-portion of the blank. The punch 50 may be operated in a well known manner by a fly wheel or the like to subject the blank to the shearing operation and I have found that the over-hanging V portion of the blank is only partially sheared and the remainder of the overhanging portion is broken off, resulting in a rough surface. To provide a desired finished surface, shear blank 10 is withdrawn from the die shoe and reinserted, being supported on the inclined face 40 of work rest 39, or in the right hand position, as viewed in Fig. 4. In this position, the previously sheared surface preferably overhangs the cutter blade to a slight extent whereby the surface may be cleanly finish sheared by a second punch 51 due to the relatively small amount of material which must be removed. Preferably two shear blade blanks are disposed in the die shoe at one time and operated on simultaneously by the punches 50 and 51 to rough shear one blank and finish shear a second blank. Although I preferably punch or shear two blanks at once, it is apparent that any desired number may be concurrently operated upon by providing a die shoe of proper size and rigidity.

The waste sheared material will be forced through the perforations 24 and 25 provided in the die shoe, and collected in a container beneath the die shoe support.

The work rest 30 and the punch backing element 42 may be securely maintained in position by bolts 55 projecting through the lateral walls 16 and 17 of the die shoe and threadedly engaging the work rest 30 and punch backing element 42. The cutter blade 38 and the work rest 39 may be maintained in proper relation by a key 56 secured to the cutter blade and projected within a recess provided therefor in the work rest. The work rests 30 and 39 and the cutter blades 28 and 38 may be rigidly secured by bolts 57 projected through the base of the die shoe and the cutter blades and threadedly engaging the work rests. The heads of bolts 57 preferably being recessed in a contour bore in the base of the die head. The hold down clamps 31 may be secured to the work rests 30 and 39 by bolts 58 projected through the hold-down clamps and threadedly engaging the work rests.

Referring now to Figs. 7 and 8, I have shown the work rest 30 with a stop element 60 adjustably mounted to position the blanks for operating thereon. The element 60 is preferably formed of the same material as the hedge shear blank and has an inwardly extending edge 61 angularly cut to abut the edge 11 of blank 10. Also the longitudinal edge of the element 60 is beveled as indicated at 62 to clear the punch 50. The element 60 is provided with a plurality of perforations 63 to receive a bolt 64 adapted to be projected through the upstanding leg 65 of an angle member 66 and secured thereto by a nut 67. The stop element can be longitudinally adjusted to permit blanks 10 to be projected varying distances into the zone of contact with punch 50. A second stop element 60 may be secured in a similar manner to work rest 39.

The other leg 68 of angle 66 is rigidly secured to sloped portion 20 of the die shoe beyond the end of the work rest 30 and cutter blade 28 by bolts 69. Thus, the stop element 60 may be adjusted without disturbing the assembled work rest and cutter blade.

Referring to Fig. 9, I have shown an arrangement for guiding the blanks into the die comprising an angle element 70 secured to the die shoe by bolts 71 and having an upstanding leg 73 to which a small angle element 74 is rigidly secured by rivets or the like 75. The blank will be cradled between the upstanding leg 73 and the horizontally extending leg of element 74 forwardly of the work holder 30, cutter blade 28 and hold-down clamp 31 and in proper alignment to be projected into operative position against the stop element 60.

Although I have found that two punching operations are sufficient for shearing material from the blanks, I contemplate that three operations may be desirable in which event a second work rest 30, cutter blade 28 and hold-down clamps would be provided between the work rests 30 and 39 shown and the initial punch would not be as heavy as in the present instance.

I preferably polish the sheared surface of the blank or blade upon removal from the die and grind to the lower longitudinal edge, Fig. 2, which rests on the cutter blade during the punching operation.

Although I have shown and described a preferred form of my invention, I contemplate that numerous and extensive departures may be made therefrom without departing from the spirit of my invention or the scope of the appended claims.

Having thus described my invention, what I claim is:

1. Apparatus for forming hedge shear blades and the like comprising a die having a recess therein for slideably receiving a reciprocal punch element generally rectangular in cross-section, means for rigidly and removably supporting a shear blade blank inclined at an angle to the direction of motion of the punch element and with a portion of the blank extending over a longitudinal edge of the recess in the path of the punch element and means for maintaining the punch element in contact with the blank during the punching operation.

2. Apparatus for forming hedge shear blades and the like, comprising a die having a generally rectangular recess formed therein to slideably receive a reciprocable punch element generally rectangular in cross-section, a cutter blade of relatively hard material supported above the recess on the die and formed to substantially align with a longitudinal edge of the recess, a support member above the cutter blade having an upwardly inclined face engaging the cutter blade along a line parallel to said longitudinal edge and slightly spaced therefrom and means for rigidly and removably supporting a shear blade blank against the inclined face of the support member with the blank edge portion engaging the cutter blade and with a portion of the blank V-shaped in cross section extending beyond said longitudinal edge in the path of the punch element.

3. Apparatus for forming hedge shear blades and the like, comprising a die having a generally rectangular recess therein, a punch element generally rectangular in cross section mounted to slideably reciprocate in said perforation, a cutter blade disposed above the perforation on the die and formed to have a longitudinal edge thereof align with a longitudinal edge of the recess, a work rest element above the cutter blade having an upwardly inclined face engaging the cutter blade along a line parallel to said longitudinal edge and slightly spaced therefrom, a clamp element having a face disposed parallel to the inclined face of the work rest element whereby a shear blade blank may be disposed between said faces with an edge portion of the blank resting on the cutter blade, the clamp element being formed to provide a continuation for one longitudinal wall of the recess to guide the punch element thereinto, and a punch backing element forming a continuation of the opposite longitudinal wall of the recess to guidingly support the punch element during the punching operation.

4. The apparatus described in claim 3, and wherein a plurality of said recesses are provided in the die, together with a plurality of punch elements, cutter blades, work rest elements, clamp elements, and punch backing elements whereby a plurality of blades may be concurrently operated upon.

WILLIAM E. BARNHART.